United States Patent [19]

Cho

[11] Patent Number: 5,121,646
[45] Date of Patent: Jun. 16, 1992

[54] DRIVING MECHANISM OF MULTI-ACTION DOLL

[75] Inventor: J. Zebmour Cho, Woodcliff Lake, N.J.

[73] Assignee: New Wonder Company Limited, Taipei, Taiwan

[21] Appl. No.: 593,445

[22] Filed: Oct. 4, 1990

[51] Int. Cl.⁵ .................. F16H 21/00; G09F 19/00; A63H 13/00
[52] U.S. Cl. .......................... 74/23; 40/411; 40/414; 74/50; 74/76; 74/86; 446/354
[58] Field of Search .............. 74/18.1, 23, 49, 50, 74/76, 77, 78, 55, 86; 40/411, 414, 416, 417, 418, 419; 446/354, 358

[56] References Cited

U.S. PATENT DOCUMENTS

| 1,510,015 | 9/1924 | Rayfield | 74/78 X |
| 1,538,562 | 5/1925 | Koshalko | 40/417 X |
| 2,794,283 | 6/1957 | Geel | 40/411 |
| 3,132,845 | 5/1964 | Norty | 74/86 X |
| 3,159,384 | 12/1964 | Davis | 74/86 X |
| 3,214,854 | 11/1965 | Swan | 40/411 |
| 3,864,779 | 2/1975 | Thomas | 74/78 X |
| 4,803,796 | 2/1989 | Ottinger | 40/414 |
| 4,911,676 | 3/1990 | Fan | 40/419 X |

FOREIGN PATENT DOCUMENTS

| 819796 | 10/1937 | France | 74/78 |
| 299742 | 10/1928 | United Kingdom | 40/417 |

Primary Examiner—Allan D. Herrmann
Assistant Examiner—David W. Laub
Attorney, Agent, or Firm—Browdy and Neimark

[57] ABSTRACT

The invention relates to the driving mechanism of multi-action doll. The driving mechanism comprises an eccentric roller, a cross-shaped driving component and several driving gears. The cross-shaped driving component has a rectangular hole which accommodates the eccentric roller which moves the cross-shaped driving component back and forth in a linear direction when the roller rotates in the hole. The cross-shaped driving component has racks that mesh with and rotate the driving gears when the driving component is moved by the eccentric roller. Rotation of the gears also rotates shafts on the gears which convey motion to selected portions of a moveable doll.

9 Claims, 6 Drawing Sheets

DRIVING MECHANISM OF MULTI-ACTION DOLL

BACKGROUND OF THE INVENTION

The present invention is directed to a doll driving mechanism for multiple action dolls. The compact and structural simplicity of the design permits the driving mechanism's use in limited spaces subject to physical abuse.

Movable dolls are attractive and interesting to consumers. However, the driving mechanisms of conventional dolls are made with driving belts driven by a motor which move various portions of the doll by a series of different sized gears which rotate. These driving mechanisms also sometimes include eccentric rollers as well as long and short connecting rods. These prior art devices have the following shortcomings:

1. The driving mechanism between the gears and connecting rods usually employ a convex block which requires an increase in the thickness of the driving mechanism which influences the design of the whole doll and precludes the design of a movable sitting doll.

2. Because the sizes of gear are different, the positioning of the shaft, and the assembling of pairs of gears are difficult. This requires skilled personnel resulting in higher manufacturing costs.

3. The driving mechanism of prior art contains more components making damage more likely if the doll is dropped or abused.

4. Because conventional mechanisms combine gears of different sizes, the rate of error in time is greatly increased.

The present invention is aimed at overcoming shortcomings of prior art devices. The driving mechanism for the moveable doll of the invention is based on use of an eccentric roller engaged to the rectangular hollow portion in the center of a driving component to perform eccentric rotation and drive the driving component to generate reciprocating linear motion. The driving mechanism utilizes the front and rear fins of a cross-shaped driving component and the racks installed on the two sides of the hollow portion to cause driving gears to be meshed respectfully and rotate at an equal angle. The rotating at equal angle of the driving gear is conveyed appropriately to the hands, feet or wings of a doll via the rotating shafts fitted in with an axle of the gears to generate harmonious and interesting actions.

SUMMARY OF THE INVENTION

The main object of the invention is to provide a driving mechanism of doll which is able to generate selected motions in a doll.

A specific object of the present invention is to contain the driving components horizontally in a compact space to be installed in a limited portion of the doll and thereby permit maximum variation in the design of the base of the doll including a movable sitting doll.

A further object of the present invention is to reduce the driving components and provide fins and sliding grooves in the assembled structure to attain stable action and a low rate of error, and especially shortening the distance between driving components resulting in powerful integrated action of the doll while retaining smoothness of action.

A still further object of the present invention is that the driving gears are in same size, thereby simplifying the production and assembly process and reducing costs.

A particularly important object of the present invention is that all driving components are fixed in a body of minimum height which is able to endure considerable bumping force without damage.

Moreover, the driving mechanism of the present invention is able to be assembled separately and then combined with the dolls having different gestures thereby improving the shortcoming in the design of conventional dolls which require different driving mechanisms for different dolls.

DESCRIPTION OF THE DRAWINGS

A brief description of the drawings for the preferred embodiment of the present invention is given as follows.

DETAILED DESCRIPTION OF THE INVENTION

Figure 1:
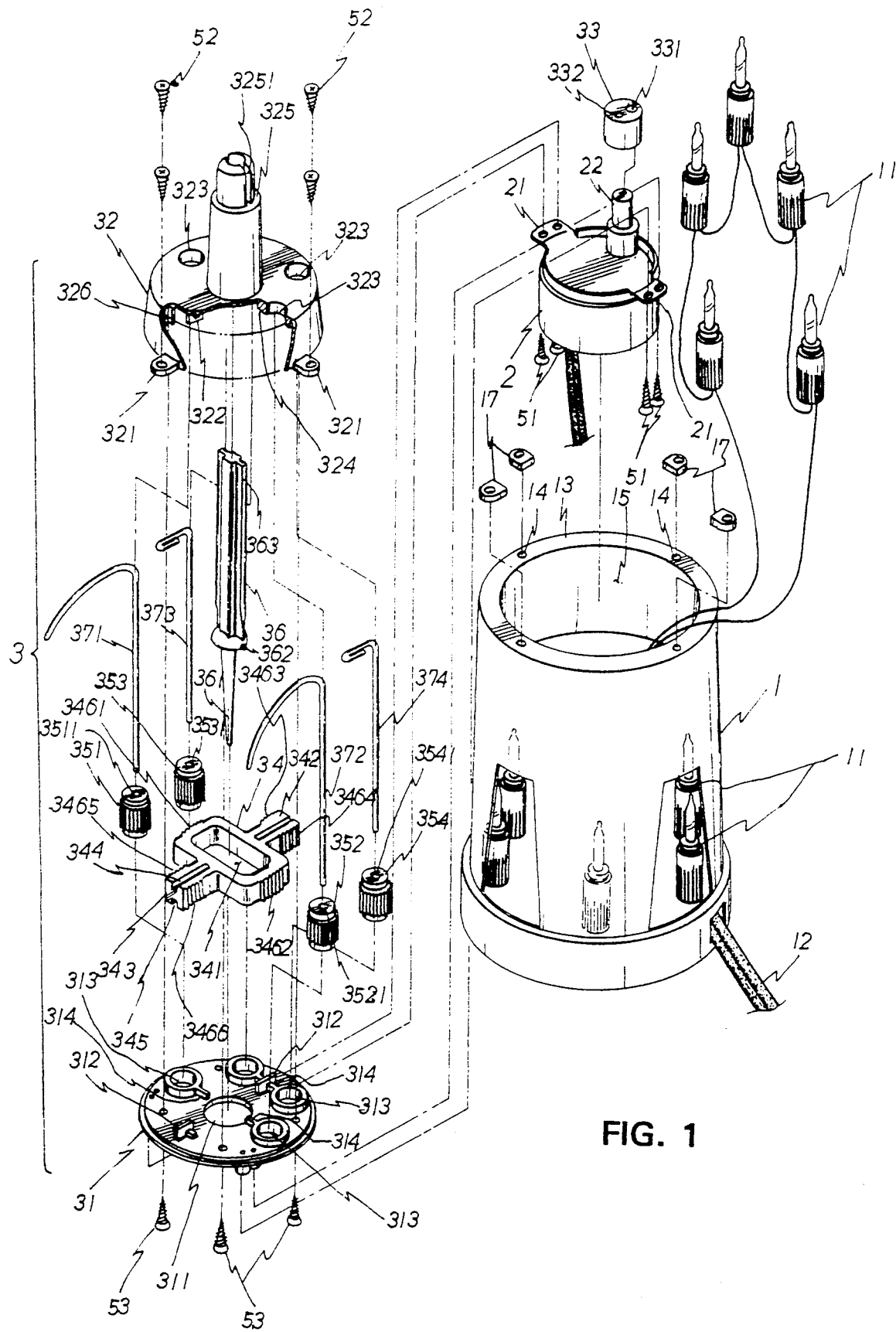
FIG. 1 is an exploded view of the present invention.
Figure 2:
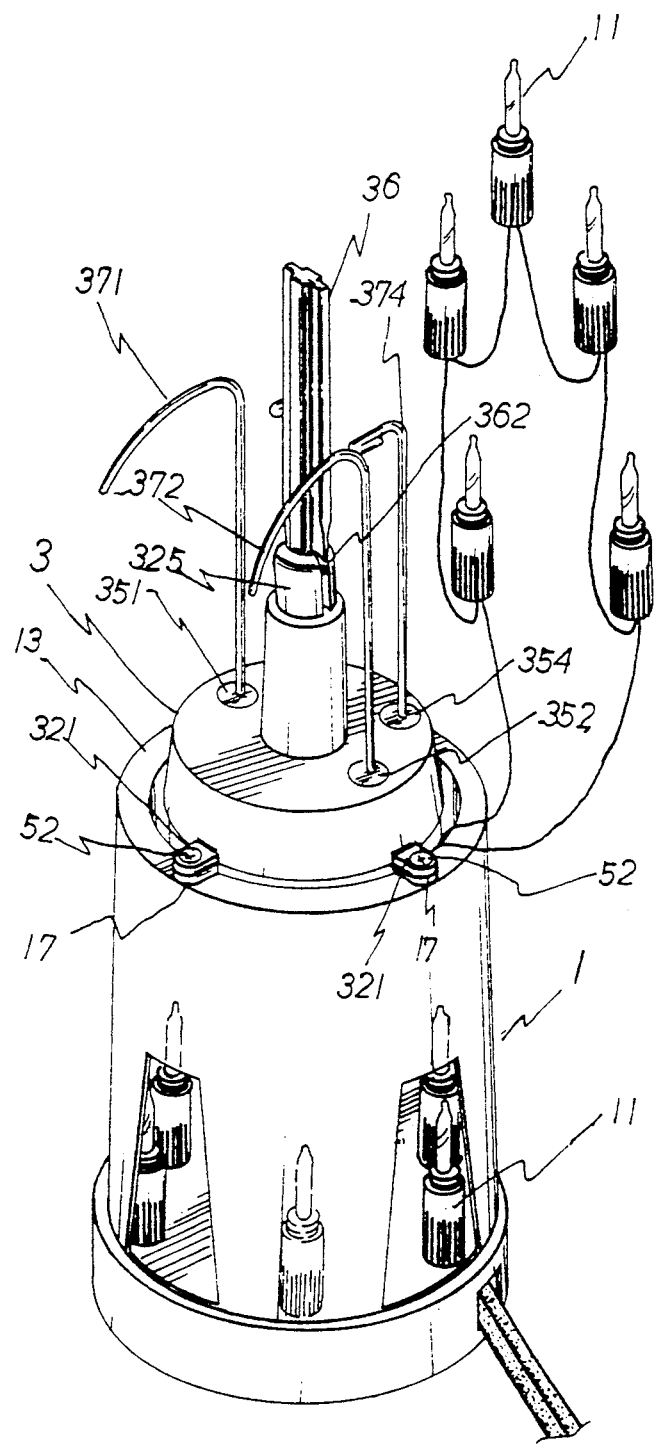
FIG. 2 is a composite view of the present invention.
Figure 3:
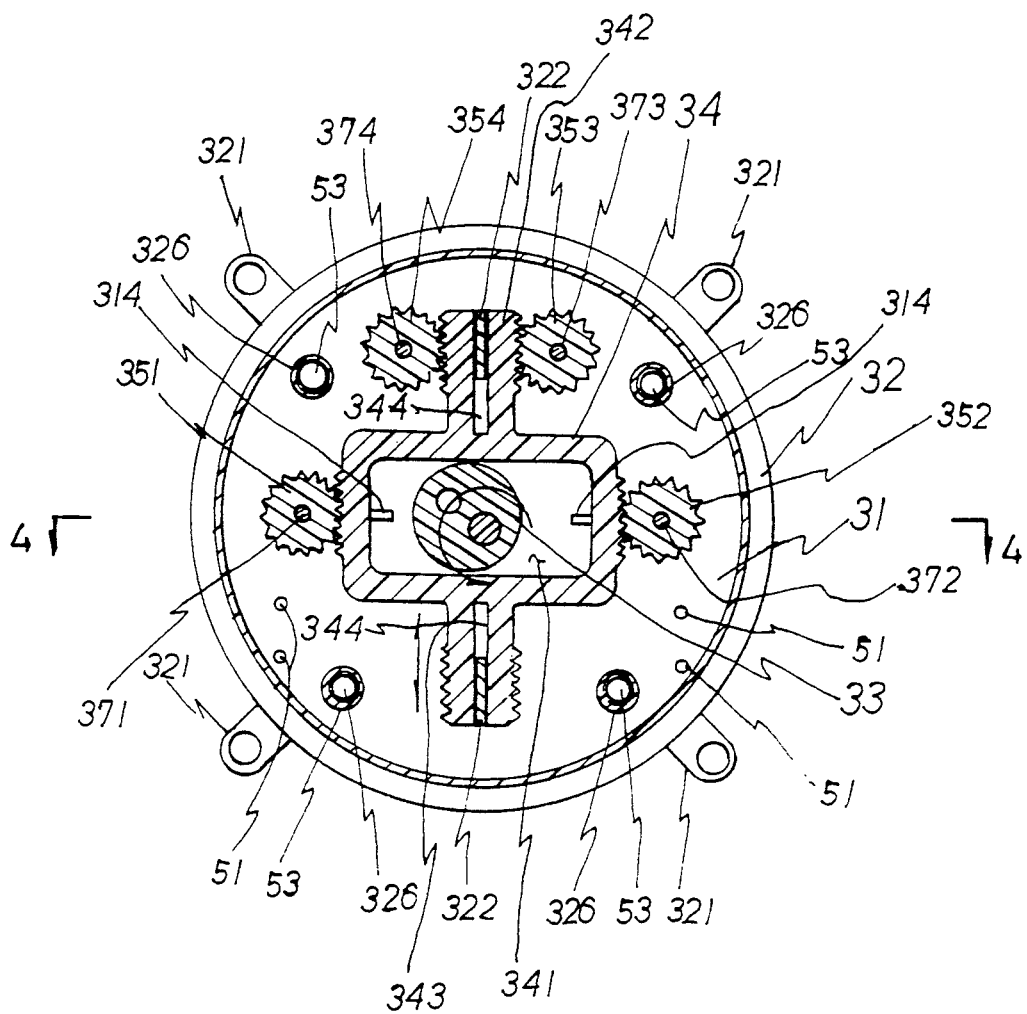
FIG. 3 is a sectional view along section 3-3 of FIG. 2.
Figure 4:
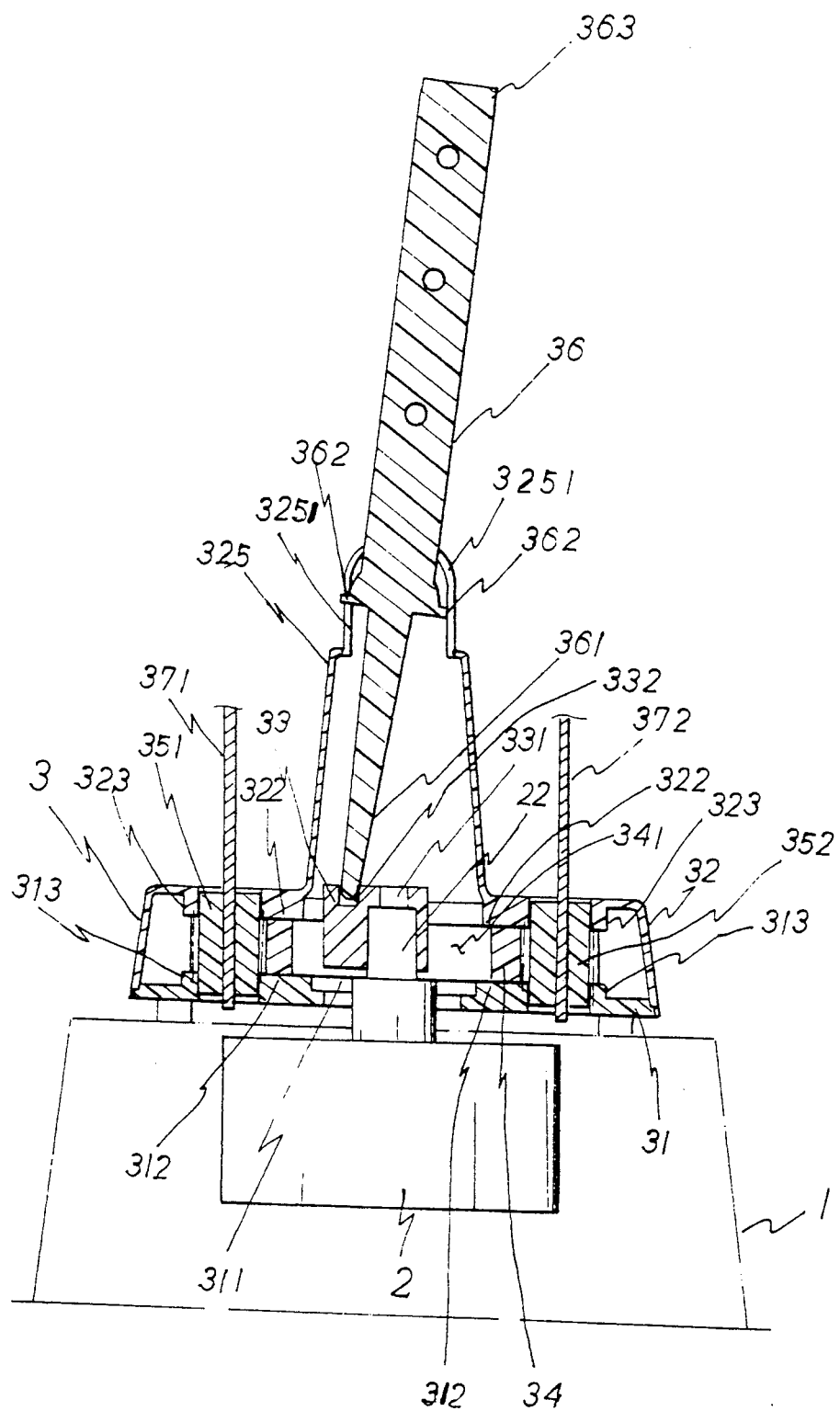
FIG. 4 is a sectional view along section 4-4 of FIG. 5.
Figure 5:
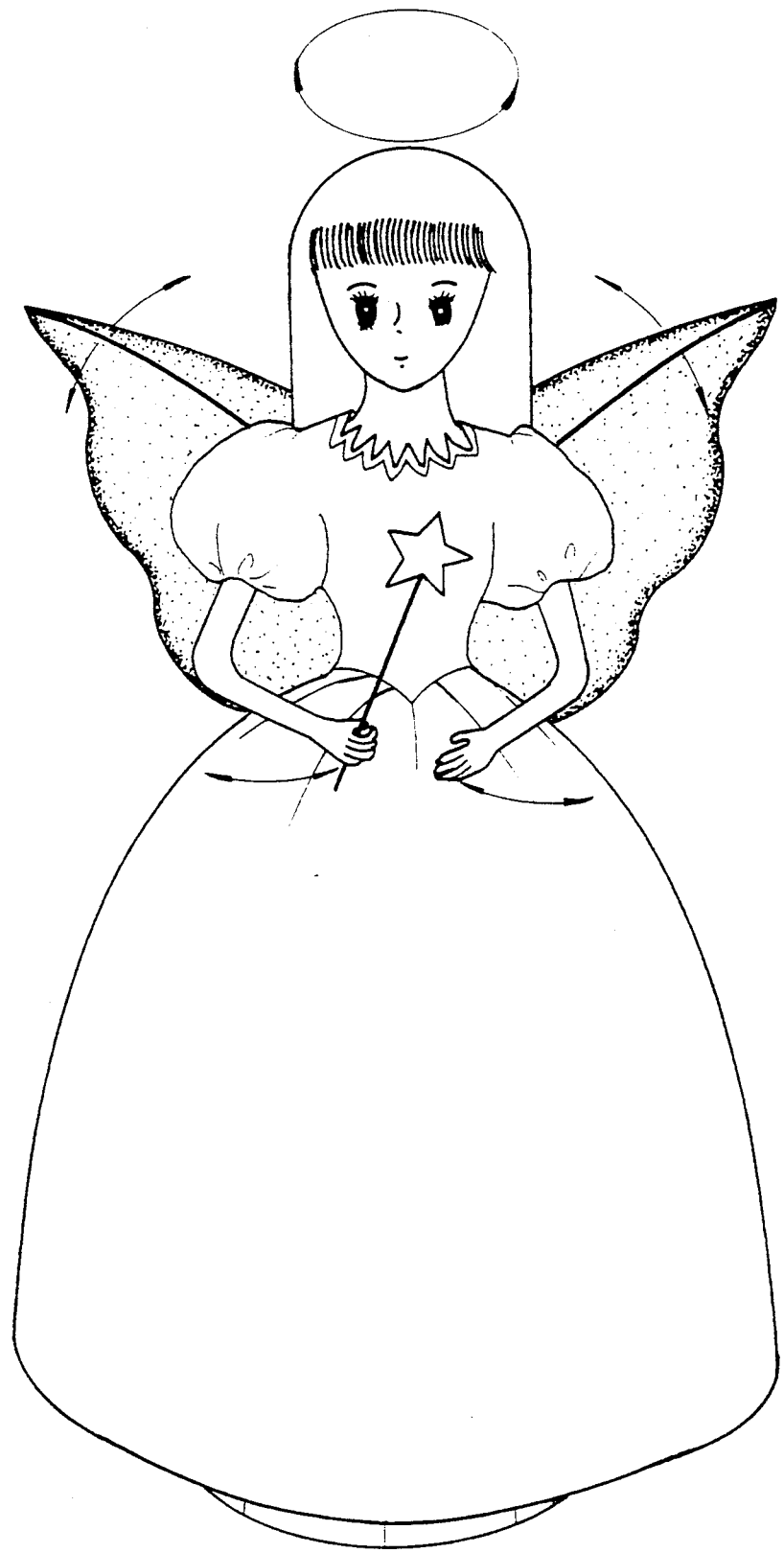
FIG. 5 is a perspective view showing the doll according to the present invention.

Referring now to FIGS. 1 and 2, the present invention comprises a base 1, a motor 2, a driving mechanism 3 and a doll (as shown in FIG. 5). The base 1 is a transparent cylindrical body with illuminant components 11 mounted in its interior. Components 11 are connected to a power supply with a wire 12 to provide power to both the illuminant 11 and the motor 2. The motor 2 is fixed on the bottom surface of the bottom plate 31 of the driving mechanism with bolts 51 through fins 21 on two sides. Fins 321 at the periphery of the thin body 32 of the driving mechanism allow penetration of bolts 52 which are locked into the tap holes 14 on the top periphery 13 of base 1 via gaskets 17 to engage the driving mechanism 3 and the base 1, and motor 2 which are then mounted in the circular hollow portion 15 above base 1. The primary feature of the structure of the present invention is the design of the driving mechanism, a detailed description of which is given as follows:

As shown in the exploded view of the driving mechanism in FIG. 1 and the sectional views of FIGS. 3 and 4, there is a thin body 32, a bottom plate 31, an eccentric roller 33, a cross-shaped driving component 34, several driving gears 351-354, a rocker 36 and rotating shafts 371-374. A rotor 22 of the motor 2 is inserted through the central hole 311 of the bottom plate 31 with an eccentric roller 33. FIG. 3 shows a central portion of the cross-shaped driving component 34 formed with a rectangular hollow portion 341 with a width approximately the same as the diameter of the eccentric roller 33 which is loosely engaged therein. FIG. 3 also shows the length of the hollow portion 341 longer than the diameter of the eccentric roller 33 allowing the eccentric roller 33 to move laterally in cavity 341.

As seen from FIGS. 1 and 3 corresponding upper and lower grooves 344, 345 on the top and bottom surfaces of the front and rear fins 342, 343 of the cross-shaped driving component 34 are fitted to the top surface of the bottom plate 31 by lower guiding blocks 312 and by guiding blocks 322 inside the body 32. Racks 3461 to 3466 on the front and rear fins 342, 343 and the two external sides of the hollow portion 341 of the cross-shaped driving component 34, are respectively meshed to driving gears 351-354. Top holes 326 inside the body 32 are provided to fasten the top surface of the bottom plate 31 with screws to body 32.

A further description of the action of the doll as shown in FIG. 5 based on the four driving gears 351 to 354 is given follows:

As best seen in FIGS. 3 and 4 the driving gears 351-354 are mounted between the upper and lower gear seats 323, 313 formed respectively on the bottom plate 31 and body 32 thereby allowing the driving gears 351-354 to rotate and pivot freely. Spacing bars 324, 314 at the outer edge of each of the upper and lower gear seats 323, 313 allow the cross-shaped driving component 34 to move freely between the body 32 and the bottom plate 31. Axle holes 3511 to 3541 respectively penetrate the central axis of the driving gears 351 to 354 and respectively engage the rotating shafts 371 to 374. Shafts 371-374 facilitate the motion generated by the driving gears which is respectively conveyed to appropriate portions of the doll via the rotating shaft 371-374 to attain the object of the actions of various portions of the doll.

In addition, as best shown in FIG. 4, axle hole 332 on the eccentric roller 33 allows the inserting engagement of the pointed rod 361 on the bottom of the rotating shaft 36 which is connected to the head of the doll. The upward and downward sliding of the fin 362 in the groove 3251 of the rocker seat 325 on the body 32 produces swaying of the head of the doll connected to the top 363 of the rocker 36 when the eccentric roller 33 is rotated.

In accordance with the present invention, while the motor 2 is started, it drives rotor 22 to operate and causes the eccentric roller 33 to rotate eccentrically between the body 32 and the bottom plate 31. Rocker 36 fitted in axle hole 332 of the eccentric roller 33 causes the head of the doll to sway in the circular path as shown in FIG. 5. The eccentric roller 33 further drives the cross-shaped driving components 34 to move inside the hollow portion 341, guided by the upper and lower guiding blocks 322, 321 fit in with the upper and lower grooves 344, 345, which lead the cross-shaped driving component 34 to perform reciprocal linear motion via respectful meshing with driving gears 351 to 354 on the upper racks 3161 to 3464 which in turn drive the rotating shafts 371 to 374. Rotation of shafts 371-374 respectively provides continuous swaying of the hands, wings, etc. of the doll as shown by the arc paths in FIG. 5.

What is shown in FIG. 5 is only one embodiment of the present invention. The driving mechanism 3 of the present invention is able to mount six driving wheels 35 in a doll to provide the effect of multiple actions to make the doll become more lively and interesting.

A notable feature of the invention is that all the driving components of the driving mechanism of the present invention are positioned on the same horizontal plane to shorten the length of driving, so that every action of the doll is powerful. Further, all the components are fixed securely between the body 32 and the bottom plate 31. Thus, even a considerable shock on the external portion of the doll, will not result in the displacement of components inside the body of the doll which will effect the driving mechanism.

Figure 6:
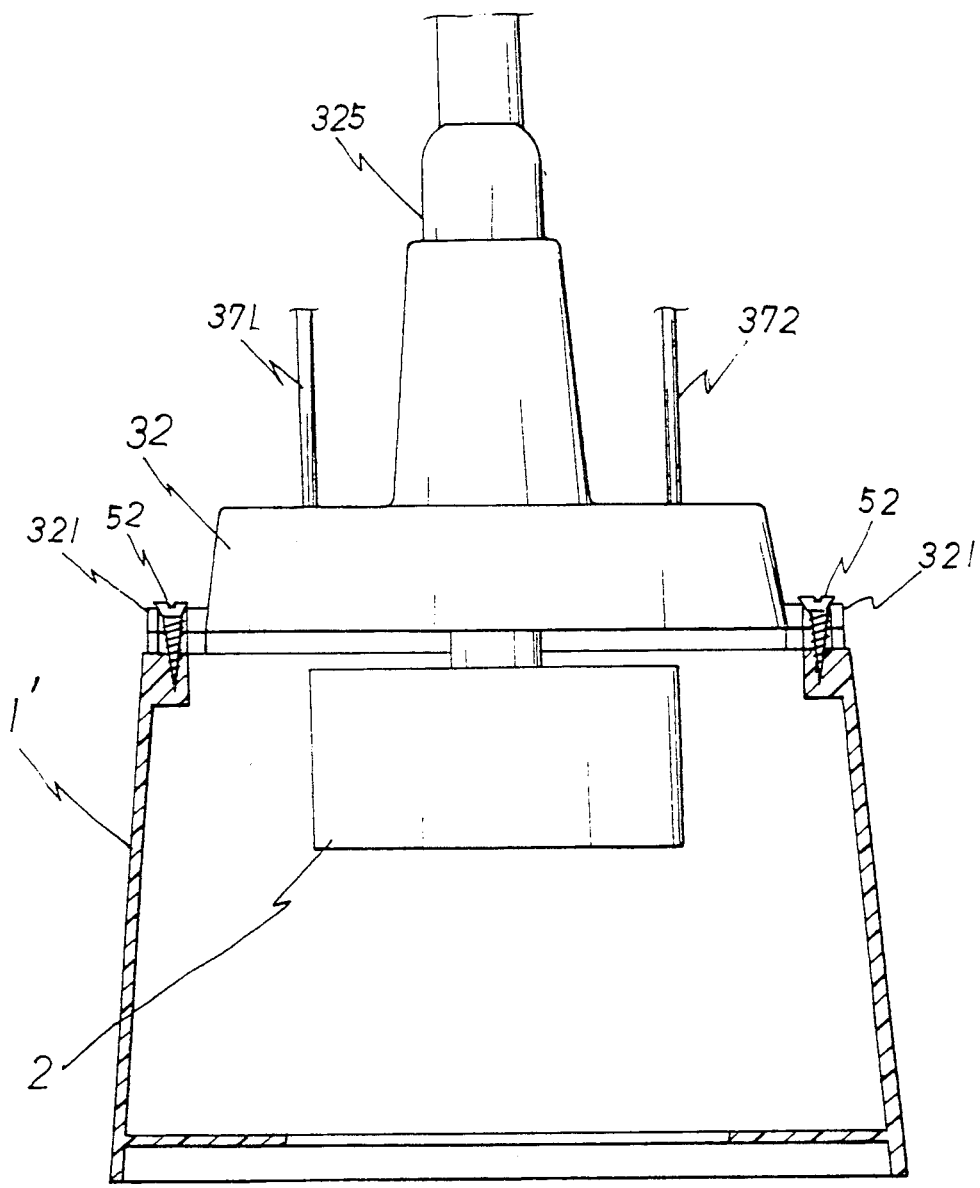
FIG. 6 is a perspective view of a base for the doll of the present invention.

Further, because the driving mechanism of the present invention is quite thin and short, a base shown in FIG. 6 can be used. This feature facilitates mounting the doll on the point of the Christmas tree.

The invention, accordingly, provides multiple functions as stated above to facilitate the driving mechanism to be employed in dolls of different styles to perform various motions. Further, the compact structure of which is much better than that of the prior art. it is obviously an improvement and innovative.

I claim:

1. A driving mechanism for producing selected movement in a doll, said mechanism comprising,
    an upper housing (32) having first guiding blocks (322) and at least one first gear seat (323),
    a bottom plate (31) having second guiding blocks (312) and at least one second gear seat (313) concentric to said first gear seat (313),
    a cross-shaped driving component (34) having a front fin (342) and a rear fin (343) and a rectangular hole (341) between said front fin (342) and said rear fin (343),
    an upper and a lower surface of each of said front fin (342) and said rear fin (343) having a groove (344, 345) respectively corresponding to said first guiding blocks (322) and said second guiding blocks (312),
    at least one side of said cross-shaped driving component (34) having a driving rack (3461-3466),
    wherein said groove on said upper and said lower surface of each of said front fin and said rear fin of said cross-shaped driving component are respectively slidably engaged by said first guiding blocks and said second guiding blocks when said upper housing (32) is engaged to said bottom plate (31),
    an eccentric roller (33) driven by a motor (2) engaged to a bottom side of said bottom plate (31),
    said eccentric roller (33) in sliding engagement with sides of said rectangular hole (341) to produce back and forth linear sliding movement of said cross-shaped driving component (34) as said motor rotates said eccentric roller,
    opposing ends of at least one gear (351-354) rotatably mounted in said at least one first gear seat and said at least one second gear seat,
    said at least one gear (351-354) rotatably driven by said driving rack (3461-3466) as said eccentric roller (33) slidably drives said cross-shaped driving component, and
    doll actuating means engaged to said at least one gear for moving selected portions of said doll when rotated by said at least one gear (351-354).

2. The driving mechanism of claim 1, wherein said cross-shaped driving component has four sides having said driving rack,
    each said driving rack driving a gear,
    each said gear having opposing ends rotatably mounted in first and second gear seats on said upper housing and said bottom plate,
    each said gear engaged to doll actuating means for moving selected portions of said doll.

3. The driving mechanism of claim 1, wherein said cross-shaped driving component has six sides having said driving rack,
    each said driving rack driving a gear having opposing ends rotatably mounted in first and second gear seats on said upper housing and said bottom plate,
    each said gear engaged to doll actuating means for moving selected portions of said doll.

4. The driving mechanism of claim 1, wherein said upper housing and said bottom plate have spacing bars (324, 314) which assist in permitting free movement of said cross-shaped driving component between said upper housing and said bottom plate.

5. The driving mechanism of claim 1, wherein said eccentric roller, said at least one gear and said cross-shaped driving component all are in the same place.

6. The driving mechanism of claim 2, wherein said eccentric roller, said each said gear and said cross-shaped driving component all are in the same plane.

7. The driving mechanism of claim 3, wherein said eccentric roller, said each said gear, and said cross-shaped component all are in the same plane.

8. The driving mechanism of claim 1, further comprising, a hole on a top surface of said eccentric roller, said hole located near the periphery of said eccentric roller, an elongated bar having a first end slidably engaged in said hole.

means on said upper housing and said bar for maintaining a central portion of said bar in sliding engagement with said upper housing as said eccentric roller rotates, wherein a second end of said bar moves selected portions of said doll as said eccentric roller rotates.

9. The driving mechanism of claim 1, wherein said bottom plate (31) and said motor (2) are mounted on a translucent base (1) having illuminating components (11).

* * * * *